United States Patent

Poulek

[11] Patent Number: 6,089,224
[45] Date of Patent: Jul. 18, 2000

[54] APPARATUS FOR ORIENTATION OF SOLAR RADIATION COLLECTORS

[76] Inventor: Vladislav Poulek, Kaśtanova 1481, 250 01, Brandys nad Labem, Czechoslovakia

[21] Appl. No.: 09/319,721
[22] PCT Filed: Dec. 8, 1997
[86] PCT No.: PCT/CZ97/00042
§ 371 Date: Jun. 10, 1999
§ 102(e) Date: Jun. 10, 1999
[87] PCT Pub. No.: WO98/26303
PCT Pub. Date: Jun. 18, 1998

[30] Foreign Application Priority Data

Dec. 12, 1996 [CS] Czechoslovakia ............... 3653-96

[51] Int. Cl.[7] ............................................ F24J 2/38
[52] U.S. Cl. ............................ 126/576; 126/578
[58] Field of Search ........................... 126/573, 576, 126/577, 578

[56] References Cited

U.S. PATENT DOCUMENTS

| | | | |
|---|---|---|---|
| 2,967,249 | 1/1961 | Quirk | 250/215 |
| 3,493,765 | 2/1970 | Kelly et al. | 250/209 |
| 4,027,651 | 6/1977 | Robbins, Jr. | 126/270 |
| 4,031,385 | 6/1977 | Zerlaut et al. | 250/203 |
| 4,082,947 | 4/1978 | Haywood et al. | 250/203 R |
| 4,223,214 | 9/1980 | Dorian et al. | 250/203 R |
| 4,290,411 | 9/1981 | Russell | 126/425 |
| 4,328,417 | 5/1982 | Himes | 250/203 R |
| 4,649,899 | 3/1987 | Moore | 126/425 |
| 5,317,145 | 5/1994 | Corio | 250/203.4 |

FOREIGN PATENT DOCUMENTS

| | | |
|---|---|---|
| 279801 | 6/1995 | Czechoslovakia . |
| 0050189 | 4/1982 | European Pat. Off. . |
| 2403525 | 4/1979 | France . |
| 3303000 | 8/1984 | Germany . |
| 4306656 | 12/1993 | Germany . |
| 1474397 | 4/1989 | U.S.S.R. . |
| 1566797 | 5/1980 | United Kingdom . |
| WO84/00068 | 1/1984 | WIPO . |
| WO93/13396 | 7/1993 | WIPO . |

*Primary Examiner*—Carroll Dority
*Attorney, Agent, or Firm*—Burns, Doane, Swecker & Mathis, LLP

[57] ABSTRACT

An apparatus for orientation of solar radiation collectors includes one or more solar cells fixed to a rotary axle of the apparatus and connected directly to an electromotor joined with a rotary axle. The solar cell is arranged on the rotary axle in such a way that a plane of the solar cell is inclined by an angle of about 0.1–45 degrees from a plane perpendicular to the collectors of solar energy and parallel with the rotary axle apparatus in a direction opposite to the direction of sun movement. The solar cell is connected to the electromotor for orientation of the rotary axle and an associated orientation of the radiation collectors as long as the power of the solar cell is higher than the power necessary for orientation of the rotary axle.

12 Claims, 6 Drawing Sheets

APPARATUS FOR ORIENTATION OF SOLAR RADIATION COLLECTORS

BACKGROUND OF THE INVENTION

1. Field of the Invention

The invention relates to the field of apparatuses for orientation of solar radiation collectors.

2. Related Art

Existing active solar trackers are usually based on electrooptical solar sensors as described for instance in U.S. Pat. Nos. 3,493,765; 4,223,214; 4,328,417; and 5,317,145. Such trackers can work with a high accuracy. These trackers are complex and, therefore, expensive and unreliable. Electrooptical solar trackers are usually composed of at least one pair of antiparallel connected photoresistors or photovoltaic solar cells which are electrically balanced by an equal intensity of illumination of both elements so that there is either no or negligible control signal on a driving motor. A differential control signal, occurs due to differential illumination of the electrooptical sensor, and is used to drive a motor and to orient an apparatus in such direction where illumination of the electrooptical sensors is equal and a balance is restored.

There are other active solar trackers based on clockworks and/or combining both principles as described in U.S. Pat. No. 4,031,385. Such trackers can work with high accuracy but they are complex and, therefore, expensive and unreliable.

Existing passive solar trackers are based on thermal expansion of matter and/or on shape memory alloys. They are usually composed of a pair of actuators working against each other which are balance by equal illumination. An unbalance of forces caused by a differential illumination of the actuators is used for orientation of the apparatus in a direction such that there is equal illumination of actuators and a balance of forces is restored, as described e.g., in U.S. Pat. Nos. 2,967,249; 4,027,651; GB Patent 1,566,797; CZ Patent 279,801 and DE 33 03 000 A1. Passive solar trackers compared to active trackers are less complex and less expensive but they work with low efficiency and they do not work at all at low temperatures.

Other active solar trackers are described in EP-A-0 050 189 and WO-A-84/00068. The apparatus described in EP-A-0 050 189 has detectors, such as photosensors with inclined sunbeam receiving surfaces, issuing a detecting signal to drive a motor so that the apparatus is always directed to the sun. The detectors are not parallel to each other. The apparatus described in WO-A-84100068 has two solar cells that are arranged parallel side by side but with their active (sunbeam receiving) surfaces oriented in the same direction.

Both active and passive solar trackers use a differential illumination of sensors and actuators, shadowing means, mirrors or lenses, and/or an arrangement of sensors or actuators to each other, and/or a combination of the above mentioned means as it is described e.g., in patents U.S. Pat. Nos. 4,082,947; 1,474,397; and DE 43 06 656 A1.

For instance, two axis solar tracking is reached by sensing solar cells placed symmetrically on concurrent faces of a pyramid or truncated pyramid while an axis of symmetry is defined by the vertex of the pyramid and by the sun. A single axis solar tracking is reached by sensing solar cells placed symmetrically on concurrent faces of a triangular prism or truncated triangular prism while a plane of symmetry is defined by the intersection of concurrent planes and by the sun.

Concurrent symmetrical arrangement of antiparallel connected solar cells is advantageous for accurate tracking of the sun as it compensates isotropic and circumsolar diffuse parts of solar radiation that decrease an accuracy of tracking. A direct radiation only is used for tracking of the sun in this case.

A disadvantage of this arrangement is reduction of power of solar cells as a diffuse circumsolar radiation represents a substantial part of the solar radiation energy.

A total output power of concurrently arranged antiparallel connected solar cells is further decreased as only a differential power can be used for tracking. A low efficiency of concurrently arranged antiparallel connected solar cells substantially increases a price of the apparatus as a price of solar cells represents a substantial part of price of the apparatus.

A further disadvantage of concurrently arranged antiparallel connected solar cells is late backtracking of solar collectors in the morning as the apparatus that finished tracking in the preceding day afternoon has no solar cell oriented in the direction contrary to the direction of sun movement. This is the reason why backtracking starts at late morning when the sun is high enough above horizon. Use of auxiliary solar cells for backtracking increases price and complexity of the apparatus. Use of curved solar cells increases the price too. Bigger cells have to be used for the same output power due to the fact that only a part of cells is illuminated. Besides, the partial illumination could damage solar cells.

DISCLOSURE OF INVENTION

The present invention avoids the above-mentioned disadvantage of the prior art apparatuses for orientation of solar radiation collectors using driving/sensing solar cells.

The invention relates to an apparatus for orientation of solar radiation collectors fixed to a rotary axle of the apparatus, having solar cells fixed to the rotary axle and connected directly to an electromotor joined with the rotary axle. The invention includes at least one solar cell for conversion of solar energy to electrical energy, this solar cell being fixed to the rotary axle of the apparatus in such a way that the plane of the cell is inclined by about 0.1–45 degrees from the plane perpendicular to the collectors of solar energy and parallel with the rotary axle of the apparatus in a direction opposite to the direction of sun movement and connected to an electromotor for orientation of the rotary axle of the apparatus as long as the power of the cell is higher than the power necessary for orientation of the rotary axle of the apparatus.

As the sun moves from the east to the west, angle β of incidence of solar radiation on sensing/driving cells is increasing up to the moment when the power of the driving D.C. motor, connected to these cells, is high enough to move solar collectors. Then the angle β of incidence starts to decrease up to the moment when the power of the D.C. motor is lower than that necessary to move solar collectors. The apparatus uses a negative feedback.

BRIEF DESCRIPTION OF DRAWINGS

The figures schematically show examples only of the arrangement of the apparatus according to the invention.

DETAILED DESCRIPTION OF THE PREFERRED EMBODIMENTS

EXAMPLE 1

Figure 1:
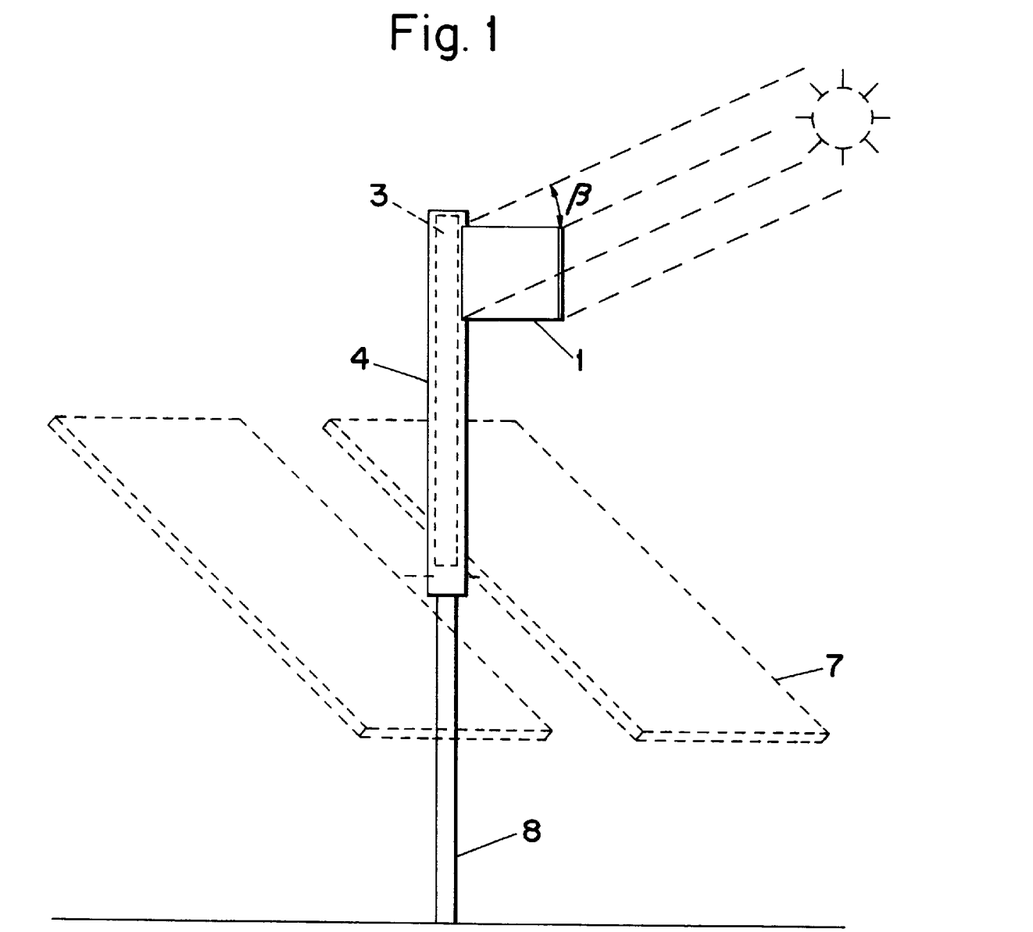
FIG. 1 shows an apparatus for orientation of solar radiation collectors with a vertical rotary axle provided with one auxiliary solar panel.

An apparatus for orientation of solar radiation collectors 7, shown in FIG. 1, comprises one solar cell 1 for conversion of solar energy to electrical energy that is fixed to a rotary axle 4 of the apparatus in such a way that a plane of the cell 1 is inclined by about 20 degrees from a plane perpendicular to collectors 7 of solar energy and parallel with the rotary axle 4 of the apparatus in a direction of sun movement. The solar cell 1 is connected directly to an electromotor 3 that is fixed in the hollow rotary axle 4 of the apparatus.

The apparatus works as follows.

The apparatus is manually oriented eastwards before sunrise. An angle $\beta$ of a solar radiation incidence on the sensing/driving solar cell 1 increases as the sun moves from the east to the west up to the moment when the power of the driving D.C. electromotor 3, connected to this cell 1, is high enough to move solar collectors 7. Then the incidence angle $\beta$ starts to decrease up to the moment when the power of the D.C. electromotor 3 is lower than that necessary to move solar collectors 7. The apparatus uses a negative feedback. The apparatus with one auxiliary solar cell 1 remains oriented westward in the afternoon. The next day, the apparatus has to be reoriented eastward in the direction opposite to the direction of sun movement manually in the morning.

A range of an automatic orientation of solar radiation collectors 7 is approximately 150°–2$\beta$ in this arrangement.

EXAMPLE 2

Figure 2:
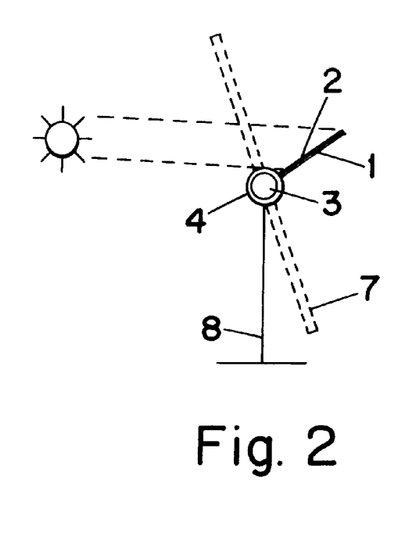
FIG. 2 shows an apparatus for orientation of solar radiation collectors with a horizontal rotary axle provided with two auxiliary solar panels in an initial morning orientation.
Figure 3:
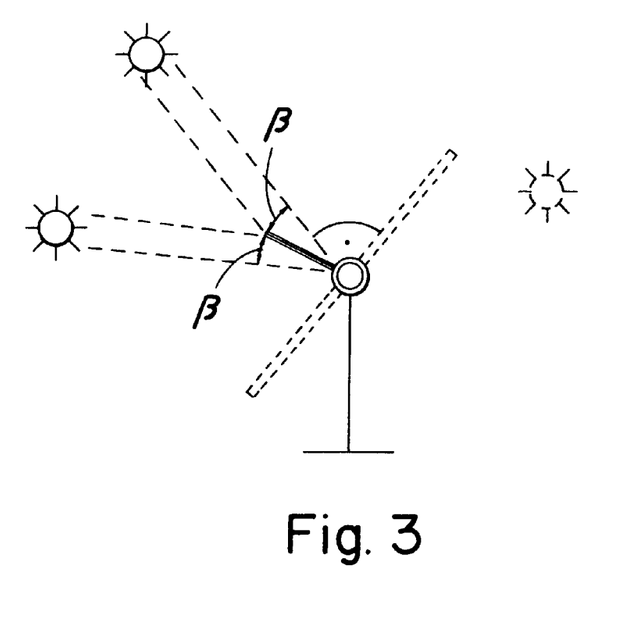
FIG. 3 shows the apparatus of FIG. 2 in an active position after sunrise.
Figure 4:
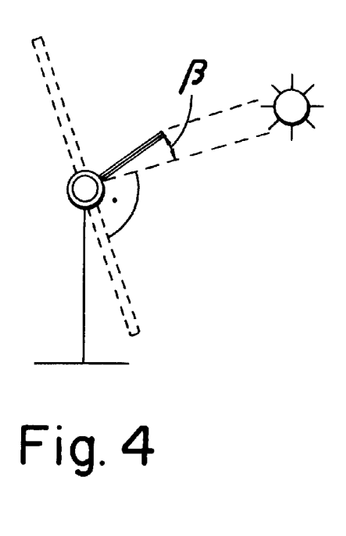
FIG. 4 shows the apparatus of FIG. 2 in a position before sunset.

FIGS. 2, 3, and 4 show a variant of an apparatus for orientation of solar radiation collectors that reorients the collectors automatically eastwards at the beginning of the day. The apparatus comprises a solar cell 1 and an auxiliary solar cell 2 which are parallel to each other and oriented in opposite directions, having approximately the same parameters. The solar cells 1, 2 are connected to opposite polarities of the reversible D.C. electromotor 3 that is fixed in a hollow rotary axle 4 of the apparatus. The solar cells 1, 2 are fixed to the horizontal rotary axle 4 of the apparatus in such a way that the plane of the cell 1 is inclined by about 20 degrees from the plane perpendicular to collectors 7 of solar energy and parallel with the rotary axle 4 of the apparatus in a direction opposite to the direction of sun movement.

The apparatus works as follows.

The apparatus is oriented westwards before sunrise. After sunrise, the solar radiation is shining under a big angle on the auxiliary solar panel 2 that is connected to the reversible D.C. electromotor 3. The reversible D.C. electromotor 3 powered by the auxiliary solar panel 2 moves the apparatus to the sun until the angle $\beta$ between the auxiliary solar cell 2 and solar radiation shining on the cell 2 is small enough that the output power of the auxiliary solar cell 2 is lower than the power necessary to move the apparatus.

The apparatus is oriented eastwards. The sun moves by the angle 2$\beta$ in the sky. The collectors of solar energy 7 do not follow the sun through this angle. As the sun moved further to the west, solar radiation is shining under big angle on the solar cell 1 that is connected to the reversible D.C. electromotor 3. The electromotor 3 powered by the solar panel 1 is lower than the power necessary to move the apparatus. FIG. 3 shows that either the solar cell 1 or the solar cell 2 is always exposed to the sun.

A range of an automatic orientation of solar radiation collectors is approximately 150°–2$\beta$ in this arrangement.

EXAMPLE 3

Figure 5:
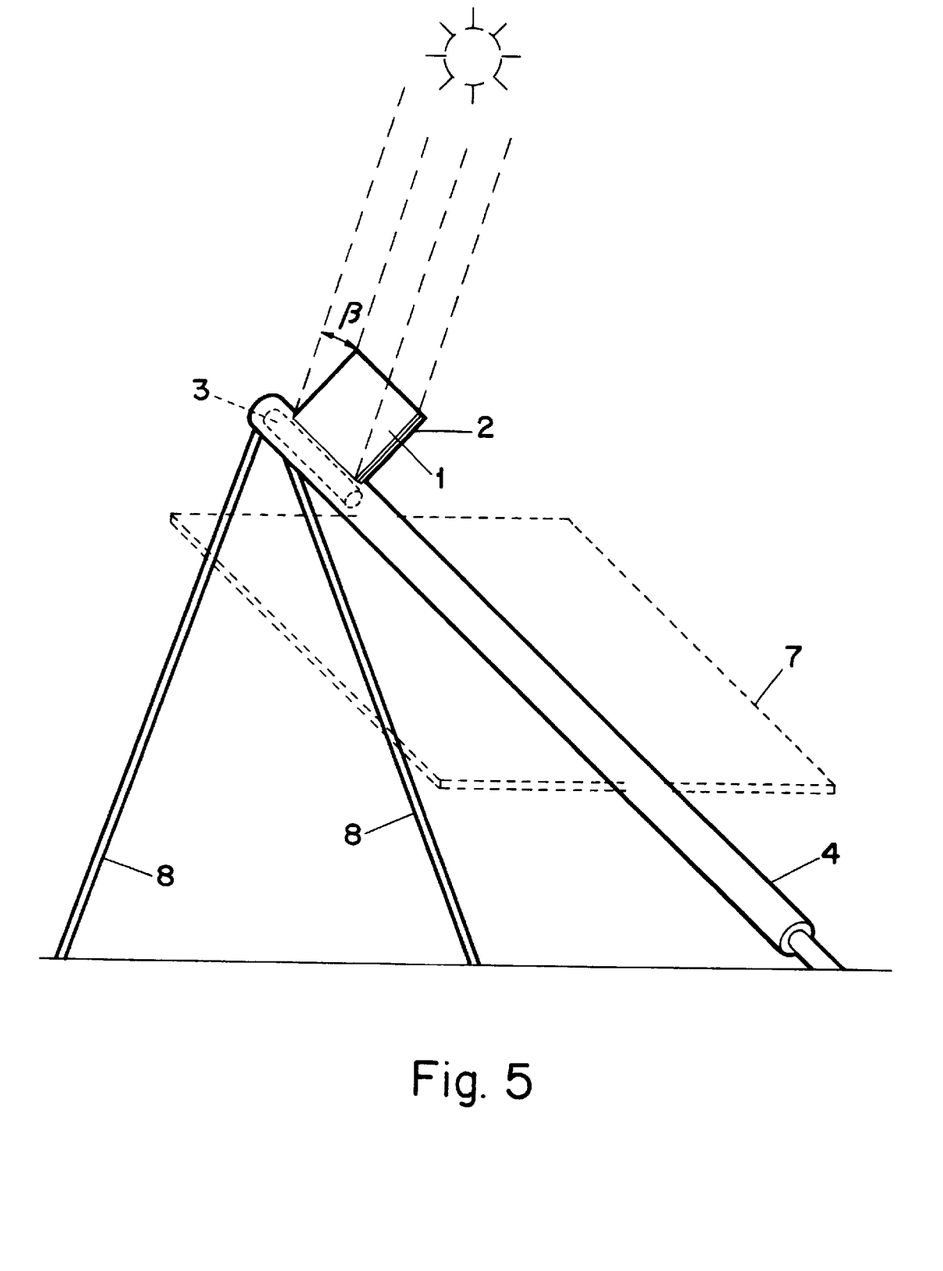
FIG. 5 shows a solar tracker with a polar rotary axle.

FIG. 5 shows a variant of the apparatus for orientation of solar radiation collectors that comprises a solar cell 1 and an auxiliary solar cell 2 which are parallel to each other oppositely oriented, and have approximately the same parameters. The solar cells 1, 2 are connected to the reversible D.C. electromotor 3 that is fixed in a hollow rotary axle 4 of the apparatus. The solar cells 1, 2 are fixed to a polar rotary axle 4 of the apparatus in such a way that a plane of the cells 1 is inclined by about 20 degrees from the plane perpendicular to collectors 7 of solar energy and parallel with the rotary axle 4 of the apparatus in a direction opposite to the direction of sun movement.

The apparatus works the same way as the apparatus in example 2.

EXAMPLE 4

Figure 6:
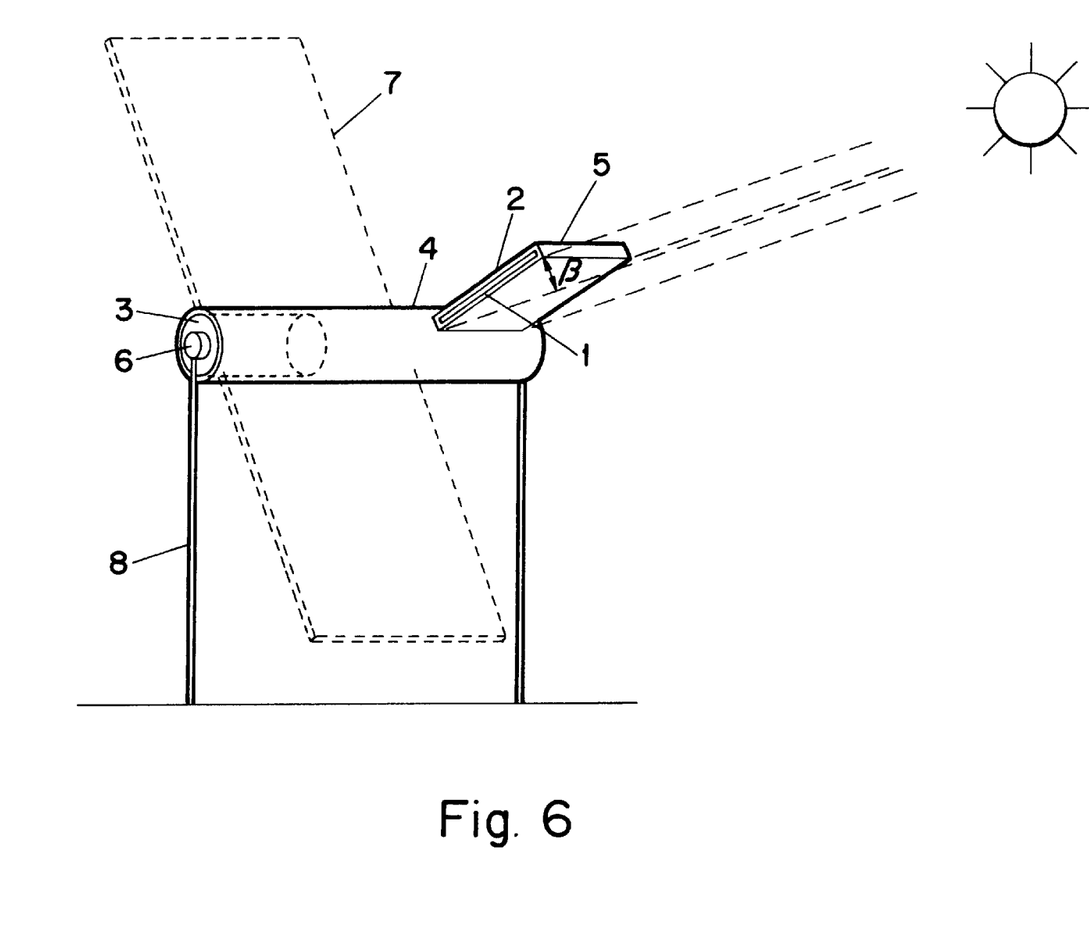
FIG. 6 shows a solar tracker with a horizontal rotary axle provided with two auxiliary solar panels placed in a common case.

FIG. 6 shows a variant of the apparatus for orientation of solar radiation collectors that comprises a solar cell 1 and an auxiliary solar cell 2 which are oppositely oriented, manufactured on a common substrate, placed in a common case and have approximately the same parameters. The solar cells 1, 2 are connected to the reversible D.C. electromotor 3 that is fixed in a hollow rotary axle 4 of the apparatus and is provided with a self-locking transmission 6. The solar cells 1, 2 are fixed to a horizontal rotary axle 4 of the apparatus in such a way that a plane of the cell 1 is inclined by about 20 degrees from the plane perpendicular to collectors 7 of solar energy and parallel with the rotary axle 4 of the apparatus in a direction opposite to the direction of sun movement.

The apparatus works as follows.

The apparatus is oriented westwards before sunrise. After sunrise, solar radiation is shining under big angle on the auxiliary solar panel 2 that is connected to the reversible D.C. electromotor 3. The reversible D.C. electromotor 3 powered by the auxiliary solar panel 2 moves the apparatus to the sun until the angle $\beta$ between the auxiliary solar cell 2 and solar radiation shining on the cell 2 is small enough that the output power of the auxiliary solar cell 2 is lower than the power necessary to move the apparatus.

The apparatus is oriented eastwards. The sun moves by the angle 2$\beta$ on the sky. The collectors 7 of solar energy do not follow the sun through this angle. As the sun moves further to the west, a solar radiation is shining under big angle on the solar cell that is connected to the reversible D.C. electromotor 3. The electromotor 3 powered by the solar panel 1 moves the apparatus to the sun until the angle β between the solar cell 1 and solar radiation shining on the cell 1 is small enough that the output power of the solar cell 1 is lower than the power necessary to move the apparatus. If the external torque, caused e.g., by the wind, is higher than the torque of the D.C. electromotor 3, a self-locking transmission 6 locks up the rotary axle 4.

EXAMPLE 5

Figure 7:
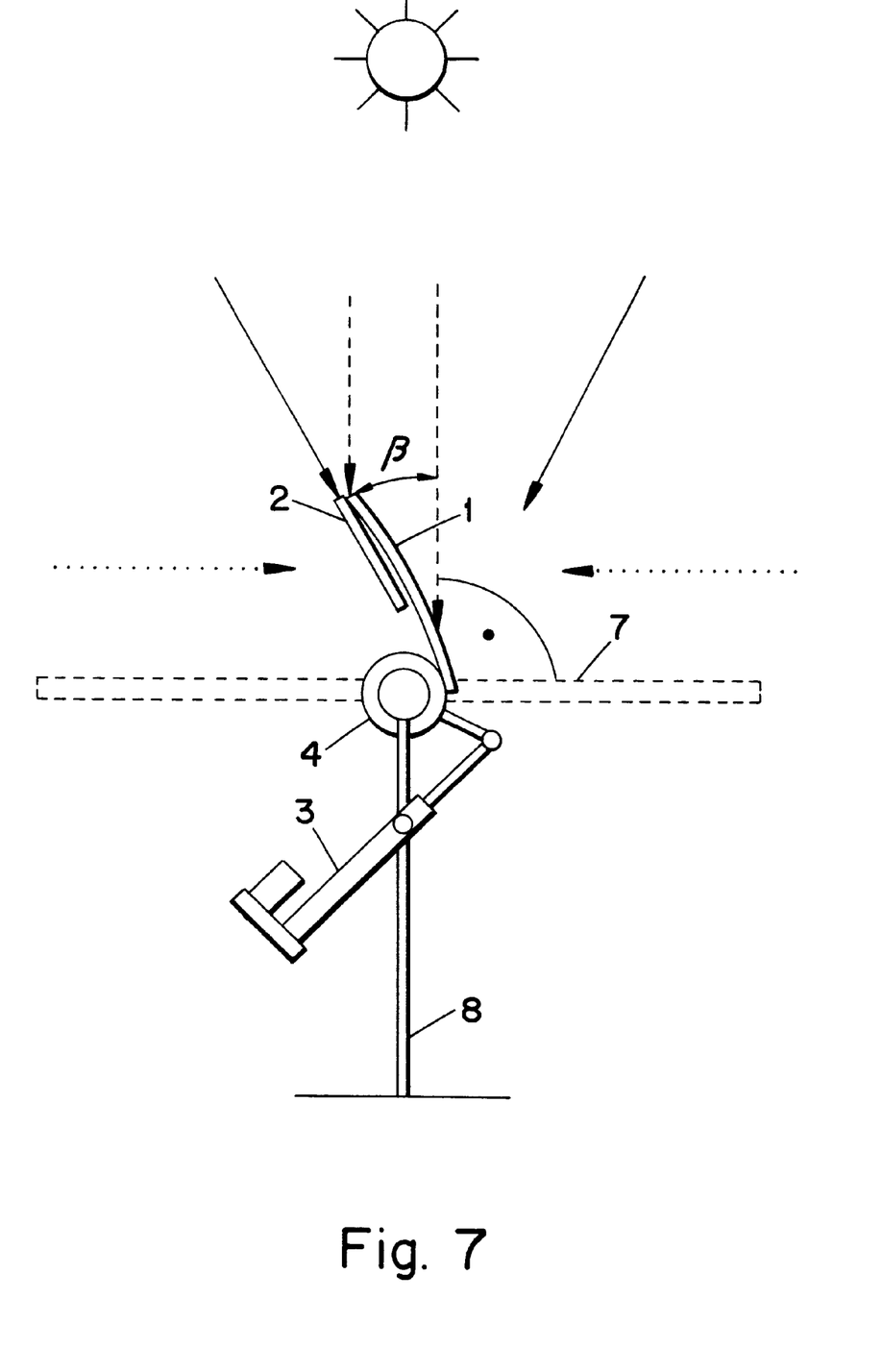
FIG. 7 shows an apparatus provided with two auxiliary solar panels with different parameters where dotted arrows represent an isotropic diffuse solar radiation, continuous arrows represent a circumsolar diffuse radiation, and dashed arrows represent a direct solar radiation.
Figure 8:
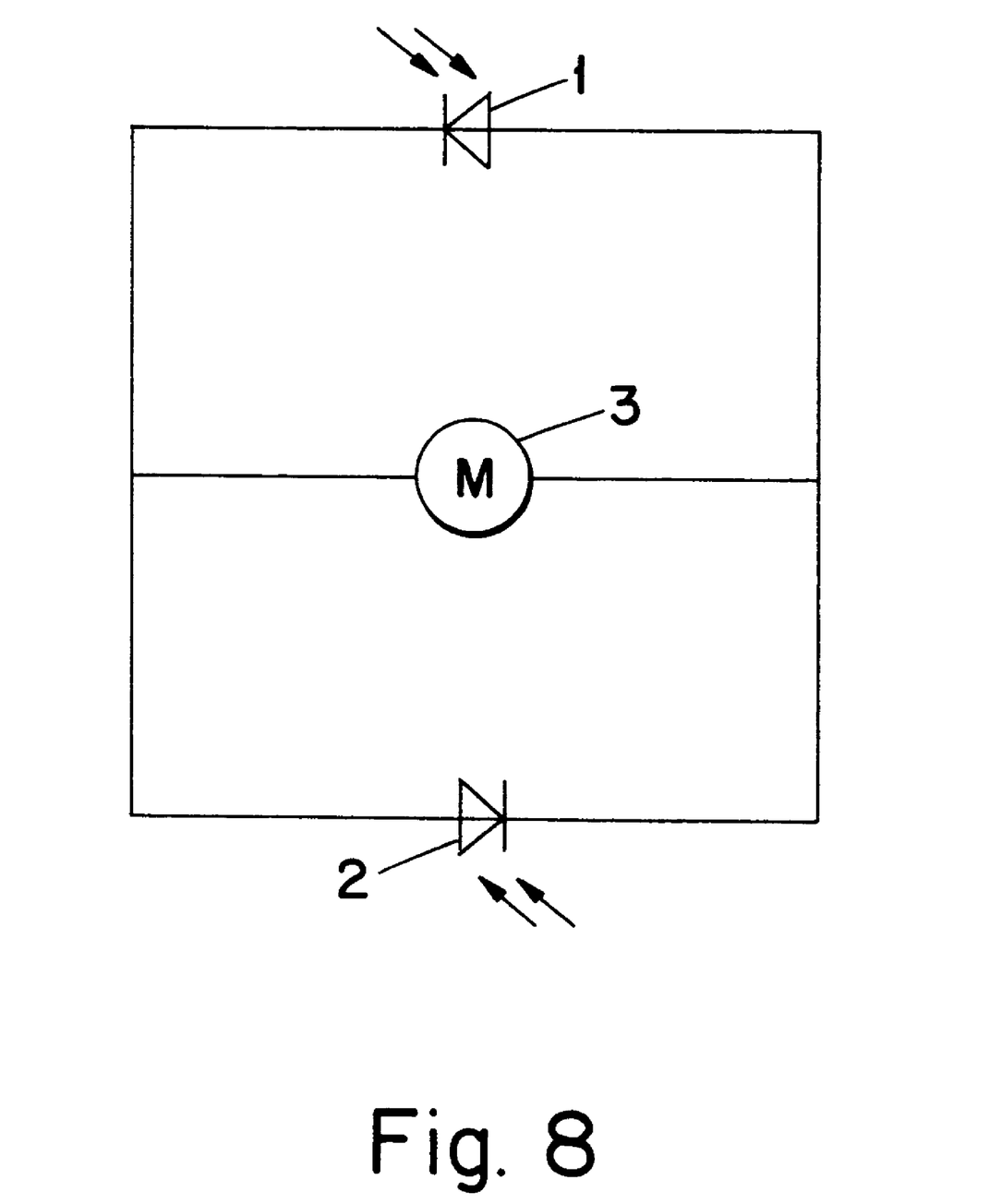
FIG. 8 shows a complete wiring diagram of an electromotor and solar cells.

FIG. 7 shows a variant of the apparatus for orientation of solar radiation collectors that comprises a solar cell 1 and an auxiliary solar cell 2 which are substantially parallel to each other, oppositely orientated and have approximately the same parameters, with different shapes. The solar cells 1, 2 are connected to the reversible linear actuator 3 that is fixed to a hollow rotary axle 4 of the apparatus. The solar cells 1, 2 are fixed to a horizontal rotary axle 4 of the apparatus in such a way that a plane of the cell 1 is inclined by about 20 angular degrees from the plane perpendicular to the collectors 7 of solar energy and parallel with the rotary axle 4 of the apparatus in the direction opposite to the direction of sun movement. The dotted arrows in FIG. 7 represent isotropic diffuse solar radiation, the continuous arrows represent circumsolar diffused radiation, and the dashed arrows represent direct solar radiation.

The apparatus works the same way as the apparatus in example 2.

The angle of about 0.1–45 degrees by which the solar cell is inclined from a plane perpendicular to collectors of solar energy and parallel with the rotary axle of the apparatus in the direction opposite the direction of sun movement is adjusted for the output power of the solar collectors. A value of the angle depends especially on parameters of the apparatus and on a local climate and it is usually about 20 degrees.

The power of the sensing cells 1, 2 is balanced by a friction in the structure of the apparatus according to the invention and by an aerodynamic drag. This is the reason why the apparatus can work with a single solar cell. The apparatus remains oriented westwards in the afternoon. The next day in the morning, the apparatus has to be reoriented in the direction opposite to the direction of sun movement manually when there is only a single solar cell. Additional oppositely oriented solar cells, placed in the same panel, and connected to an opposite polarity of the electromotor enables backtracking of the tracker. In the apparatus according to the invention, one solar cell at a time is illuminated by direct solar radiation.

Existing trackers use at least two sensing/driving solar cells balanced to each other and their differential power is used to overcome the friction and the aerodynamic drag. When tracking the sun by existing apparatuses for orientation of solar radiation collectors, both solar cells are illuminated by a direct solar radiation.

The apparatus according to the invention uses a direct solar radiation and it usually uses the whole, not only a differential, power of the solar cells connected to the electromotor. Additionally, the apparatus uses a diffuse circumsolar radiation and compensates only for a low power isotropic diffuse radiation.

The function of the apparatus does not depend on an exact adjustment of antiparallel solar cells as it is designed for tracking accuracy about ±10 degrees. This is the reason why neither exactly planar nor exactly parallel solar cells are needed.

The arrangement according to the invention enables a production of oppositely arranged solar cells on a common substrate and an integration of oppositely arranged solar cells in one "bifacial" panel. As expenses of manufacturing and encapsulation of solar cells represent a substantial part of the price of the apparatus, the new solution according to the invention enables substantial reduction of its price.

A parallel arrangement of solar cells according to the invention enables using a diffuse circumsolar part of the solar radiation that is compensated for by a concurrent arrangement of solar cells. The diffuse circumsolar part of the solar radiation that decreases an accuracy of tracking the sun can be used as the accuracy of tracking the sun, necessary to maximize a collectible soar energy, is decreasing by increasing a diffuse part of the solar radiation.

The accuracy necessary to maximize a collectible solar energy in the case of prevailing direct solar radiation is about ±10 degrees. The accuracy necessary to maximize a collectible solar energy in the case of prevailing diffuse solar radiation is about ±30 degrees. If there is a diffuse isotropic solar radiation only, tracking the sun is not necessary.

Using the circumsolar diffuse part of the solar radiation enables the collection of a maximum solar energy amount by an optimum but not a maximum accuracy of tracking the sun.

The apparatus can use photovoltaic, thermoelectric, or photoelectrochemical cells and/or combined cells.

An electromotor fixation in a rotary axle simplifies an assembly of the apparatus and its design is more compact than existing design with linear electrical actuators. The electromotor can be provided with a self-locking transmission that protects the motor against damage by external forces, for instance by wind surges.

Connection of the electromotor directly to solar cells, without any electronic circuits, substantially increases reliability of the apparatus.

The new arrangement according to the invention is generally less expensive, simpler, more compact, and more efficient than existing solar trackers and it enables an early morning apparatus backtracking.

The new tracker with tracking accuracy about ±10 degrees enables the collection by flat plates and low concentration collectors of nearly the same amount of solar radiation as more expensive electronic trackers with tracking accuracy ±0.1 degrees that are designed especially for high concentration collectors of solar radiation.

The preceding description of the arrangement of the apparatus for orientation of solar radiation collectors shows only some variants of the apparatus and does not represent all existing variants of the apparatus possible according to the invention.

The apparatus for orientation of solar radiation collectors according to the invention is applicable to any equipment using solar energy for various aims, e.g., heating water, conversion to electric power, and the like.

What is claimed is:

1. An apparatus for orientation of solar radiation collectors comprising:

at least one solar radiation collector fixed to a rotary axle of the apparatus;

at least one solar cell fixed to the rotary axle of the apparatus for conversion of solar energy to electrical energy, the solar cell oriented in such a way that a plane of the solar cell is inclined by about 0.1–45 degrees from a plane perpendicular to the at least one solar radiation collector and parallel with the rotary axle of the apparatus, in a direction opposite to a direction of sun movement; and an electromotor connected to the solar cell and the rotary axle for orientation of the rotary axle of the apparatus as long as a power of the cell is higher than a power necessary for orientation of the rotary axle of the apparatus.

2. The apparatus according to claim 1, wherein the electromotor is a reversible electromotor and the at least one solar cell comprises two solar cells which are approximately planar, having approximately the same parameters, being approximately parallel to each other, and located in such a way that an active surface of a second of the solar cells is directed in a opposite direction than the direction of an active surface of a first of the solar cells.

3. The apparatus according to claim 2, wherein the two solar cells are connected to opposite polarities of the electromotor.

4. The apparatus according to claim 2, wherein the two solar cells are on a common substrate and placed in a common case.

5. The apparatus according to claim 1, wherein the solar cell is photovoltaic.

6. The apparatus according to claim 1, where in the solar cell is photoelectrochemical.

7. The apparatus according to claim 1, wherein the solar cell is combined photovoltaic and photoelectrochemical.

8. The apparatus according to claim 1, wherein the angle between the plane of the solar cell and the plane perpendicular to the collector and parallel to the rotary axis is about 20 degrees.

9. The apparatus according to claim 1, wherein the electromotor is a liner actuator.

10. The apparatus according to claim 1, wherein the electromotor is positioned within the rotary axle.

11. A method for orienting a solar radiation collector comprising:

providing a first solar cell fixed to a rotary axle of a solar radiation collecting apparatus;

orienting the first solar cell in a plane which is inclined by about 0.1–45 degrees from a plane perpendicular to a solar radiation collector and parallel to the rotary axle in a direction opposite to a direction of sun movement; and orienting the solar radiation collector by powering an electromotor connected to the rotary axle with the first solar cell.

12. The method according to claim 11, wherein a second solar cell is provided and directed in an opposite direction to the first solar cell and the second solar cell reorients the solar collector in the morning.

* * * * *

UNITED STATES PATENT AND TRADEMARK OFFICE
CERTIFICATE OF CORRECTION

PATENT NO.    : 6,089,224
DATED         : July 18, 2000
INVENTOR(S)   : Vladislav Poulek It is certified that error appears in the above-identified patent and that said Letters Patent is hereby corrected as shown below:

Title page,
Item [30], under Foreign Application Priority Data, delete "[CS] Czechoslovakia" and insert therefor -- [CZ] Czech Republic --;

Column 2,
Line 1, under FOREIGN PATENT DOCUMENTS delete "Czechoslovakia" and insert therefor -- Czech Republic --.

Column 1,
Line 58, delete "Nos." 4,082,947; 1,474,397 and insert therefor -- No. 4,082,947; SU 1,474,397 --.

Column 4,
Line 14, delete "panel 1" and insert therefor -- cell 1 moves the apparatus to the sun until the angle $\beta$ between the solar cell 1 and solar radiation shining on the cell 1 is small enough that the output power of the solar cell 1 --.

Column 6,
Line 14, delete "soar" and insert therefor -- solar --.

Signed and Sealed this

Thirteenth Day of November, 2001

Attest:

NICHOLAS P. GODICI
Attesting Officer    Acting Director of the United States Patent and Trademark Office

UNITED STATES PATENT AND TRADEMARK OFFICE
CERTIFICATE OF CORRECTION

PATENT NO.    : 6,089,224
DATED         : July 18, 2000
INVENTOR(S)   : Vladislav Poulek It is certified that error appears in the above-identified patent and that said Letters Patent is hereby corrected as shown below:

<u>Title page,</u>
Item [76], Inventor:, delete "Czechoslovakia" and insert therefor -- Czech Republic --.

Signed and Sealed this

Twenty-fourth Day of September, 2002

Attest:

JAMES E. ROGAN
Attesting Officer     Director of the United States Patent and Trademark Office